United States Patent
Bocceda

[11] 3,762,263
[45] Oct. 2, 1973

[54] DEVICE FOR MAKING HOLES IN PIPES

[76] Inventor: Franco Bocceda, Viale E. Stefini 8, Milan, Italy

[22] Filed: Sept. 13, 1971

[21] Appl. No.: 176,399

[30] Foreign Application Priority Data
Mar. 15, 1971   Italy .............................. 20561 A/71

[52] U.S. Cl. .......................... 83/660, 72/325, 83/30, 83/54, 137/318
[51] Int. Cl. ....... B21d 31/02, B26f 1/24, F16l 41/04
[58] Field of Search .......................... 83/54, 30, 660; 72/325, 326; 137/318

[56] References Cited
UNITED STATES PATENTS

| | | |
|---|---|---|
| 3,495,615 | 2/1970 | Ehrens et al. ........................ 137/318 |
| 3,606,565 | 9/1971 | Morain et al. ................... 137/318 X |
| 3,617,145 | 11/1971 | Celmer et al. ................... 137/318 X |
| 3,620,115 | 11/1971 | Zieg et al. .......................... 83/660 X |
| 114,446 | 5/1871 | Kenney ................................ 83/660 |

Primary Examiner—Andrew R. Juhasz
Assistant Examiner—James F. Coan
Attorney—Guido Modiano et al.

[57] ABSTRACT

A device for making holes in pipes of copper, brass and plastics material comprising an internally threaded body provided with an externally threaded end section and adapted to removably connect to the sleeve of an offtake connector, and which houses a threaded pressure pin comprising an external end for the application of force and an internal end adapted to act on the shaft of a boring bit guided on to the pipe to be bored inside the connector.

2 Claims, 12 Drawing Figures

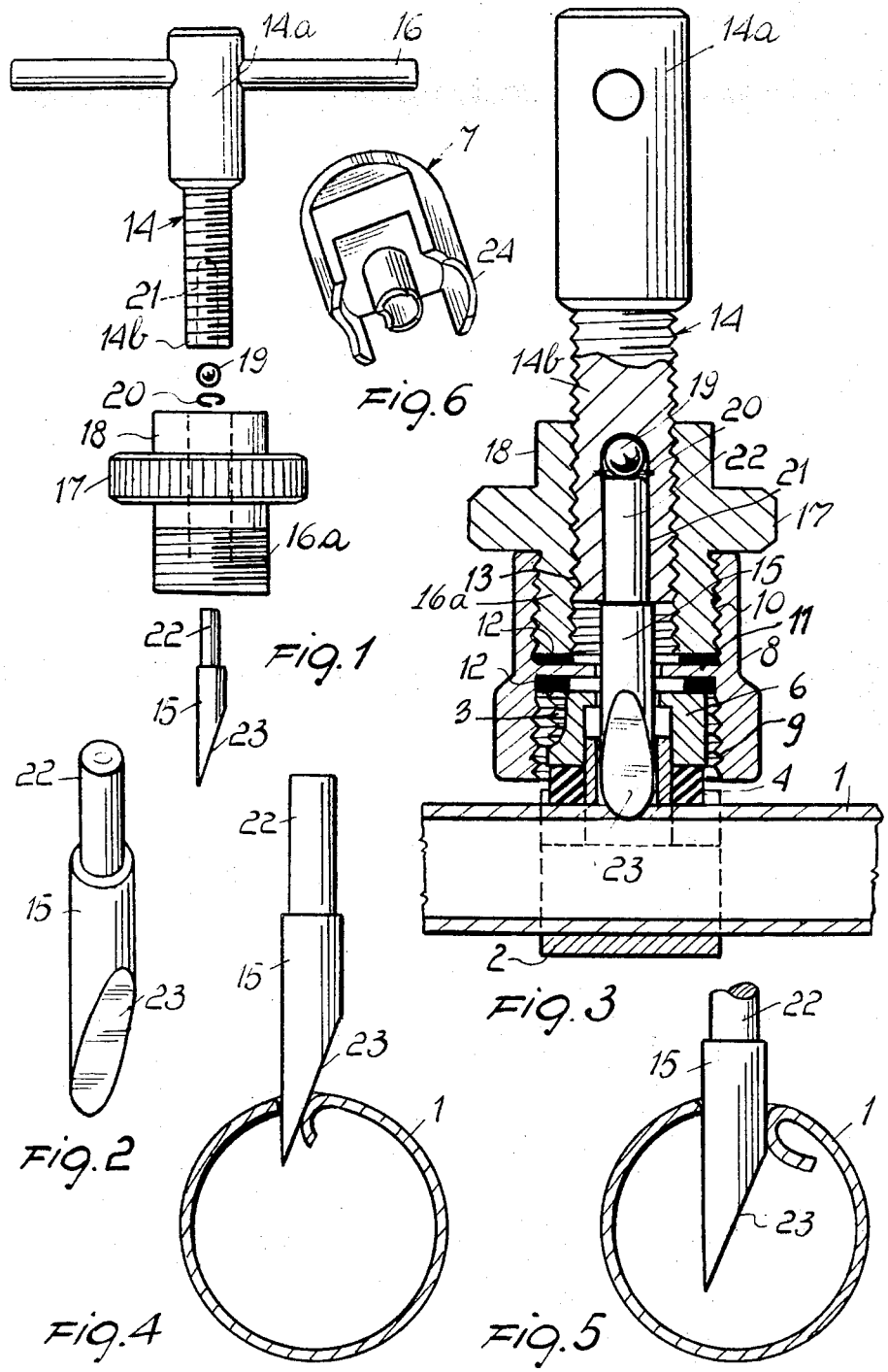

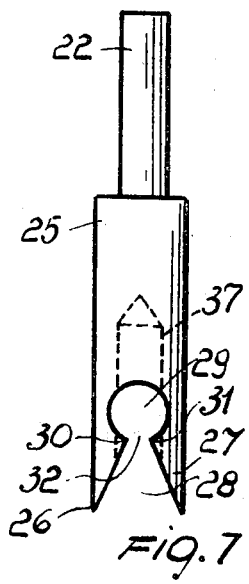
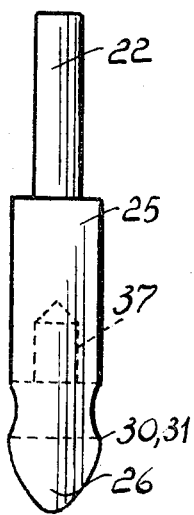
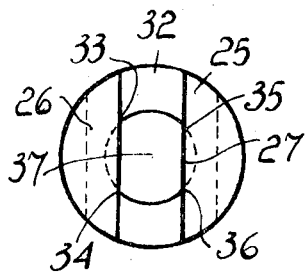
Fig. 7  Fig. 8  Fig. 9
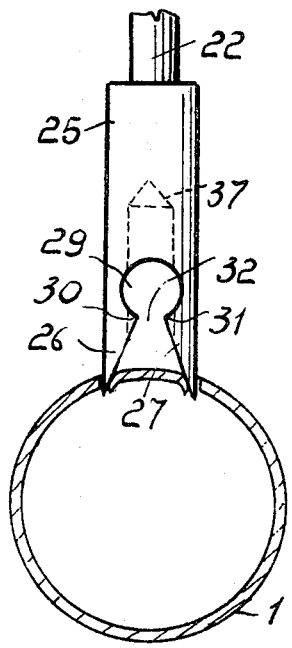
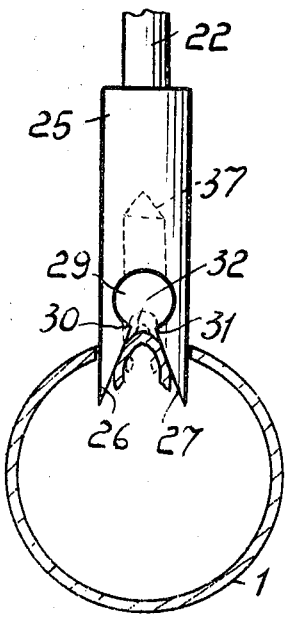
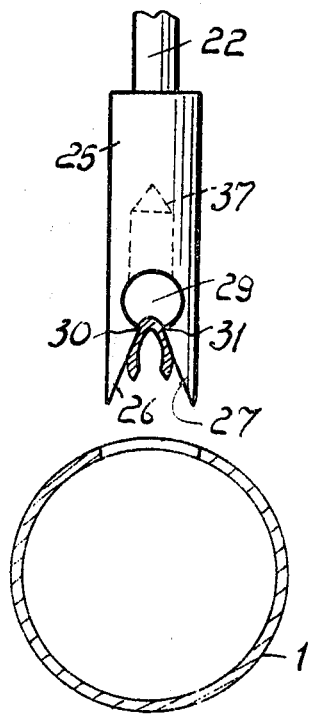
Fig. 10  Fig. 11  Fig. 12
INVENTOR
Franco BOCCEDA
AGENT

DEVICE FOR MAKING HOLES IN PIPES

BACKGROUND OF THE INVENTION

The present invention relates to a device for making holes in ducts of copper, brass and plastics materials such as PVC and the like, for fluids, air and gas.

In application Ser. No. 826,305 filed on May 19, 1969 to the same Applicant there is disclosed an offtake connector for pipes, which comprises a fork member adapted to partially circumscribe the pipe at the zone from which the branch is to be made, a second resilient member inserted between the arms of said fork and configured in such a manner as to complete the circumscription of the duct, a length of hollow pipe or the like which passes through the mass of said resilient member and extends from said pipe, a member adapted to engage with the arms of said fork and clamp it against said pipe by compressing said resilient member tight against the surface of the pipe, one end of said length of pipe being adapted to connect to the branch line and the opposite end communicating with the inside of the main pipe by way of a hole made in its wall.

In the abovementioned application the hole in the fluid carrying duct at the branch point was made by means of a drill, the hole being made after the connector or branch device was already assembled.

It has however been found in practice, that in some cases the drillings made while boring the hole and which remain in the fluid carrying pipe, are successively dragged by the fluid itself and can give rise to various disadvantages.

The object of the present invention is consequently that of providing a device and process for making connecting holes in such a manner that no individual drillings are left inside the fluid carrying duct.

Moreover, according to the present invention, the proposed device must be such as to allow the hole to be made with the connector in position and also to maintain all the advantages of said connector as fully described in the main patent.

SUMMARY OF THE INVENTION

According to the present invention, these objects are attained, by a boring device comprising an internally threaded body provided with an externally threaded end section and adapted to removably connect to the sleeve of an offtake connector, and which houses a threaded pressure pin comprising an external end for the application of force and an internal aend adapted to act on the shaft of a boring bit guided on to the pipe to be bored inside the connector.

According to the invention the shaft of the boring bit is houseable in a corresponding seat provided in the internal end of the threaded pressure pin, a sphere being positioned in the bottom of said seat in order to give a substantially punctiform transmission of force.

A boring bit according to the invention comprises a circular transversal section and a working end with two opposing cutting sections defining a middle reverse V groove whose vertex is removed by a diametral undercut in such a manner as to give rise to two opposing parallel pinch sides which form a pinch neck for the removed drillings, further gripping edges being provided on said pinch sides.

The boring process when using the abovementioned bit comprises a first stage in which incisions are made in the fluid pipe at two points disposed on a straight line orthogonal with the longitudinal axis of the pipe, a second stage of advancement of the cuters into the pipe with simultaneous further bilateral shearing of the drillings and their simultaneous bending in the form of a reverse V, and finally a third stage of separation and simultaneous pinching of the drillings in the boring bit, from which they are manually expelled after extraction of the bit from the fluid carrying pipe.

The invention also comprises a modified boring bit which comprises a circular transversal section and a unilateral chamfer on the whole of its transversal section.

The process relative to the use of this modified embodiment of the boring bit comprises a first stage of incision of the pipe wall, a successive stage of enlargement of the incision following advancement of the bit, with a simultaneous bending of the drillings towards the wall of the fluid carrying pipe, and a third phase of lateral bending of the drillings following the crushing action exerted by the edge of connection between the chamfered surface and the solid lateral surface of the boring bit.

BRIEF DESCRIPTION OF THE DRAWINGS

Further characteristics and advantages of the invention will be more evident from the detailed description given hereinafter of two preferred but not exclusive embodiments of a device according to the invention, illustrated in the accompanying drawings in which:

FIG. 1 is an axiometric view of the device according to the invention, comprising a boring bit forming drillings bent inside the fluid carrying duct consisting of soft material such as copper, brass or plastics;

FIG. 2 is a perspective view of the boring bit of FIG. 1,

FIG. 3 is a partially facial and partially sectional view of the application of the device according to the invention to an offtake connector according to the application mentioned above which is already assembled on a duct for fluids, air or gas;

FIGS. 4 and 5 are transversal sections which show respectively the first and last stage of formation of the hole with the bending of the drillings;

FIG. 6 is a perspective view of an embodiment relative to an insert which improves the application of the connector according to the main patent;

FIGS. 7 and 8 show a further boring bit according to the invention, one view being rotated through 90° with respect to the other;

FIG. 9 is a view from below of the bit of FIG. 7;

FIGS. 10 – 12 show various stages illustrating the cutting and removale of the disc or drillings removed by the bit shown in FIGS. 7 – 9.

DESCRIPTION OF THE PREFERRED EMBODIMENTS

With reference to the above Figures the main components include a pipe 1 from which an offtake is to be made, a fork member 2 with two threaded arms 3, a resilient block 4, a pipe or insert 6 co-operating with the block 4, a sleeve 8, two internal threads 9 and 10 in the sleeve, the collar 11 between said threads and gaskets 12.

The device for making holes according to the invention comprises an internally threaded body 18, a threaded pin 14 which engages with said internal thread, and a first boring bit 15. More particularly, the internally threaded body 13 has one end 16a threaded externally and adapted to engage with the thread 10 of the sleeve 8, a roughened external collar 17, preferably knurled with a threaded co-axial through bore 13.

The threaded pin 14 comprises an external end 14a for applying force by means of a cross bar 16 as shown, or by a conformation for use with spanners, and an internal end 14b which co-operates with the boring bit 15. In order to put a punctiform pressure on the bit 15, there is a sphere 19 inserted between the threaded pin 14 and the boring bit 15, positioned by a resilient ring 20 in the bottom of the seat 21 co-axial with the pin 14 and dimensioned so as to house the shaft 22 of the bit 15.

The working end of this latter comprises a unilateral chamfer 23 on the whole transverse section.

FIG. 6 shows an insert 7 which, unlike that shown in FIG. 3 and in the application referred to above, comprises two lateral projections 24 which during the fixing of the connector prevent the external sides of the flexible block 4 from deforming, so as to increase and improve the adherence of the block 4 to the pipe 1. FIG. 3 illustrates the commencing position for making holes with lateral bending of the drillings formed, using a bit as heretofore described. By acting on the cooperating end 14a the threaded pressure pin 14 is made to rotate, with consequent forced lowering of the boring bit 15. As the bit successively penetrates the pipe, drillings are formed which because of the chamfer of the bit are gradually bent to an ever greater extent towards that wall of the pipe facing the chamfer, and finally they are crushed laterally by means of the terminal edge of the chamfer. At this stage it is only necessary to unscrew the collar 17 and remove the bit 15, for example by means of pliers.

The boring bit 25 illustrated in FIGS. 7 – 9 permits the removal of the drillings. Said bit comprises two opposing cutting sections 26, 27 which define a middle groove in the form of a reverse V 28. The vertex of said groove is removed by a diametral undercut 29 and in this manner two parallel opposing sides or edges 30; 31 are formed and which act as pinching sides. They form the pinch neck 32. There are four gripping edges 33, 34, 35, 36, the first pair formed on the cutter 26 and the second pair on the cutter 27 by boring a hole 37 co-axial with the neck 32 and having a diameter slightly greater than the width of said neck.

The greater the diameter, the more distant apart will be the edges, 33, 34, and 35, 36, respectively.

Using the bit 25, the hole is made as follows.

On compressing the threaded pressure pin 14, an initial incision is made in the duct as shown in FIG. 10. As the bit 25 is further inserted, the drillings which are formed are compelled to slide on the internal sides of the cutters 26 and 27 until the cutters are nearly completely inserted into the pipe, when the drillings will start to embed themselves in the pinching groove 32, and when completely removed from the duct said drillings will be more firmly retained following the gripping action of the edges 33–36. At this stage the bit can be extracted, the drillings remaining firmly embedded in the pinching neck.

From that heretofore described it is clear that a boring device according to the invention allows a pipe to be bored exactly at the branch point without the formation of separated drillings, the one or the other boring process being chosen according to circumstances.

Obviously, the boring device heretofore described can be used not only on the offtake connector according to the application referred to above but also on other devices.

The invention so conceived is susceptible to numerous modifications and variations, all of which lie within the field of the inventive concept.

I claim:

1. In a device for making holes in pipes of soft material such as copper, brass and plastics, for fluids, air and gas, and associated with an offtake connector for fixing to the pipe to be bored at the branch point, for example a rapid fixing connector comprising a fork member adapted to partially circumscribe the pipe at the zone from which the branch is to be made, a second resilient member inserted between the arms of said fork and configurated in such a manner as to complete the circumscription of the pipe, a length of hollow duct or the like which passes through the mass of said resilient member and extends from said duct, a member adapted to engage with the arms of said fork and clamp it against said pipe by compressing said resilient member tight against the surface of the pipe, one end of said length of duct being adapted to connect to the branch line and the opposite end communicating with the inside of the main pipe by way of a hole made in its wall, said device comprising an internally threaded body provided with an externally threaded end section and adapted to removably connect to the sleeve of the connector, and which houses a threaded pressure pin comprising an external end for the application of force and an internal end adapted to act on the shaft of a boring bit guided on to the duct to be bored inside the connector, means being provided for making possible a transmission of punctiform force from the threaded pressure pin to the boring bit, the improvement wherein said boring bit has a circular transverse section and a working extremity with two opposed cutting sections defining a median groove of reverse V form, whose vertex is removed by a diametral undercut in such a manner as to give rise to two parallel opposed pinching sides forming a pinch neck for the removed drillings, further gripping edges being provided on said pinching sides.

2. The device of claim 1, wherein said means for the punctiform transmission of force consist of a sphere.

* * * * *